US010656416B2

(12) United States Patent
Qin et al.

(10) Patent No.: US 10,656,416 B2
(45) Date of Patent: May 19, 2020

(54) DISPLAY DEVICE AND AUTOMOTIVE HEAD-UP DISPLAY SYSTEM WITH ORDINARY WINDSHIELD USING THE SAME

(71) Applicant: CONSERVE & ASSOCIATES, Inc., Taoyuan (TW)

(72) Inventors: Zong Qin, Taoyuan (TW); Kuang-Tso Luo, Taoyuan (TW)

(73) Assignee: Conserve & Associates, Inc., Taoyuan (TW)

( * ) Notice: Subject to any disclaimer, the term of this patent is extended or adjusted under 35 U.S.C. 154(b) by 365 days.

(21) Appl. No.: 15/854,318

(22) Filed: Dec. 26, 2017

(65) Prior Publication Data

US 2019/0049723 A1 Feb. 14, 2019

(30) Foreign Application Priority Data

Aug. 11, 2017 (CN) .......................... 2017 1 0684683

(51) Int. Cl.
| | | |
|---|---|---|
| *G02B 27/14* | (2006.01) | |
| *G02B 27/01* | (2006.01) | |
| *G01G 23/37* | (2006.01) | |
| *G02B 3/08* | (2006.01) | |
| *G02B 27/00* | (2006.01) | |

(52) U.S. Cl.
CPC ..... *G02B 27/0101* (2013.01); *G01G 23/3728* (2013.01); *G02B 3/08* (2013.01); *G02B 27/0018* (2013.01); *G02B 2027/011* (2013.01); *G02B 2027/0121* (2013.01)

(58) Field of Classification Search
CPC .. G02B 27/0101; G02B 3/08; G02B 27/0018; G02B 2027/011; G02B 2027/0121; G01G 23/3728
USPC .................................. 359/630, 631; 345/7, 9
See application file for complete search history.

(56) References Cited

U.S. PATENT DOCUMENTS

2017/0199378 A1* 7/2017 Kawana ................. B60K 35/00

* cited by examiner

*Primary Examiner* — William Choi
(74) *Attorney, Agent, or Firm* — Winston Hsu

(57) ABSTRACT

An automotive head-up display system with an ordinary windshield comprises an ordinary windshield and a display device, wherein the distance between the inner surface and the outer surface of the ordinary windshield is equal across the ordinary windshield, and the inner surface and the outer surface are non-processed and free of any optical film. The display device includes an image source and an optical imaging module. Compared with the traditional technologies, the automotive head-up display system with an ordinary windshield of the invention can effectively solve the ghost/double image problem and reduce the assembling and production costs of the automotive head-up display system without using the wedged windshield or any optical film.

14 Claims, 6 Drawing Sheets

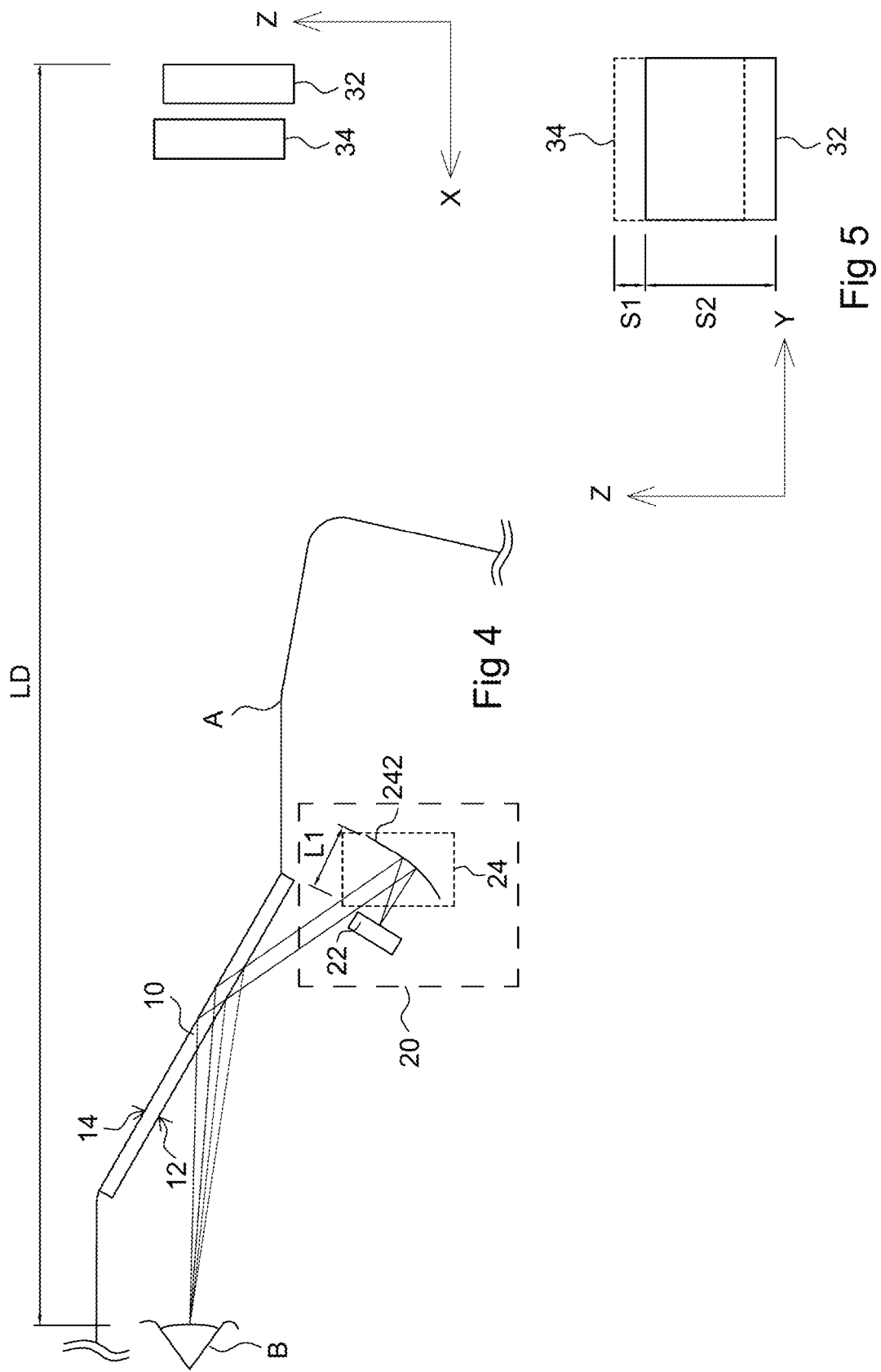

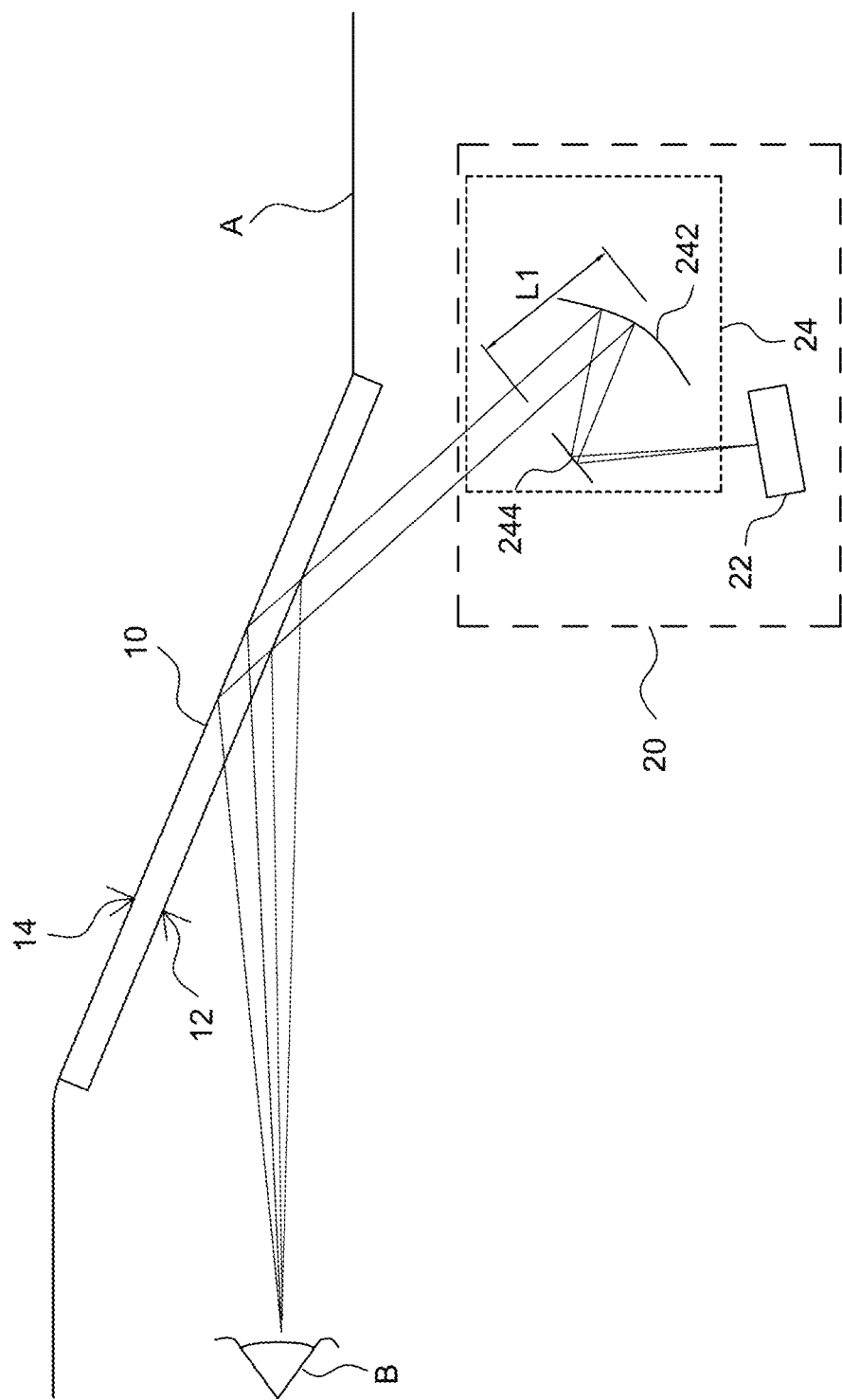

DISPLAY DEVICE AND AUTOMOTIVE HEAD-UP DISPLAY SYSTEM WITH ORDINARY WINDSHIELD USING THE SAME

BACKGROUND OF THE INVENTION

Field of the Invention

The present invention relates to a display device and an automotive head-up display system with an ordinary windshield using the same, particularly to a display device and an automotive head-up display system using the same, which solves the ghost image problem.

Description of the Prior Art

During driving, the action that the driver lowers his head to watch the instrument panel or another consumer electronic product may interfere with the action of observing the traffic status and cause accidents. Therefore, transferring the driving information from the instrument panel to a head-up display (HUD) becomes an important measure to improve driving safety.

Refer to FIG. 1. The conventional automotive head-up display system is a complicated display device, using a special windshield to reflect imaging light and generate virtual images 2.5 m on the front of the driver. The special windshield is a wedge-section windshield or a windshield having an optical film coated thereon or stuck thereto.

Refer to FIG. 2 for the reasons that the conventional automotive head-up display system must adopt a special windshield or an additionally-processed windshield. The complicated conventional display device uses a plurality of curved-surface reflecting mirrors to make the virtual images generated by the automotive head-up display system appear about 2.5 m on the front of the driver. If an ordinary windshield is adopted (it is neither processed additionally nor equipped with an optical film, and the distance between the outer surface and inner surface is the same across the windshield), a first virtual image (the primary image) and a second virtual image (the ghost image), which are separated from each other, will appear in the direction perpendicular to the line of sight of the driver. This is the so-called ghost image phenomenon. The ghost image phenomenon will hinder the driver from watching the image of driving information clearly. In order to eliminate the ghost image, the conventional technologies normally apply optical coating to the windshield or stick an optical film (a polarizer or an interferometer plate) onto the windshield. Refer to FIG. 3. Alternatively, the conventional technologies adopt a wedged windshield to eliminate the ghost image. In fact, the wedged windshield is the most common technical scheme to solve the problem. In the cross section, the inner surface of the wedged windshield is slightly deviated from the outer surface by a small angle. Thereby, the ghost image is moved to a position, which seemingly coincides with the position of the primary image for the driver. The wedged windshield is very expensive because it is fabricated via thermosetting polyvinyl butyral (PVB) between two pieces of glass. Therefore, the conventional HUD is not used in budget automobiles but only used in luxury automobiles.

Accordingly, the present invention proposes a display device that cooperates with an ordinary windshield to eliminate the ghost image phenomenon and an automotive head-up display system using the same to popularize HUDs.

SUMMARY OF THE INVENTION

The present invention provides a display device and an automotive head-up display system with an ordinary windshield using the same. The automotive head-up display system of the present invention can lower the ratio of ghost image generated by the automotive head-up display system to less than 0.5% by merely using an ordinary windshield. Thereby, the driver is not able to perceive the ghost image. The present invention can effectively solve the ghost image problem without using a wedged windshield or an optical film. Therefore, the present invention can reduce the fabrication and assembly costs of the automotive head-up display system.

In one embodiment, the automotive head-up display system of the present invention comprises an ordinary windshield and a display device. The ordinary windshield is joined with the body of an automobile. The ordinary windshield has an inner surface and an outer surface. The distance between the inner surface and the outer surface is the same across the ordinary windshield. The inner surface and outer surface are free of coating and optical film. The display device includes an image source and an optical imaging module. The image source is disposed inside the automobile body and generates imaging light. The optical imaging module is disposed at the light-output side of the image source and projects the imaging light to the ordinary windshield. The inner surface and the outer surface reflect the imaging light to the driver to respectively form a first virtual image and a second virtual image. The distance between the first virtual image and the driver is greater than or equal to a virtual image distance. The ratio of ghost image determined by the first virtual image and the second virtual image is less than or equal to 0.5%.

In one embodiment, the display device of the present invention includes an image source and an optical imaging module. The image source is disposed inside the body of an automobile and generates imaging light. The optical imaging module is disposed at the light-output side of the image source and projects the imaging light to an ordinary windshield of the automobile. An inner surface and an outer surface of the ordinary windshield reflect the imaging light to the driver to respectively form a first virtual image and a second virtual image. The distance between the inner surface and the outer surface is the same across the ordinary windshield. The inner surface and the outer surface are free of coating and optical film. The distance between the first virtual image and the driver is greater than or equal to a virtual image distance. The ratio of ghost image determined by the first virtual image and the second virtual image is less than or equal to 0.5%.

Below, embodiments are described in detail in cooperation with the attached drawings to make easily understood the objectives, technical contents, characteristics and accomplishments of the present invention.

BRIEF DESCRIPTION OF THE DRAWINGS

FIG. 4 is a diagram schematically showing a display device and an automotive head-up display system according to one embodiment of the present invention;

FIG. 5 is a diagram schematically showing the ghost image phenomenon according to one embodiment of the present invention;

FIG. 10 is a diagram schematically showing a display device and an automotive head-up display system according to one embodiment of the present invention.

DESCRIPTION OF THE PREFERRED EMBODIMENTS

Figure 1:
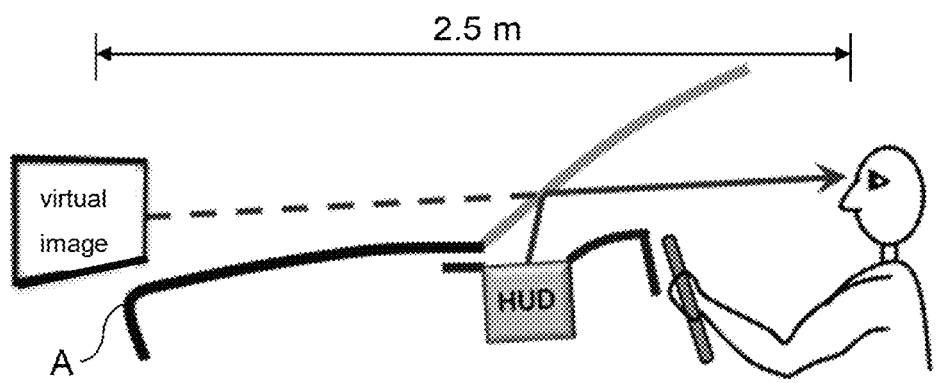
FIG. 1 is a diagram schematically showing a conventional automotive head-up display system.
Figure 2:
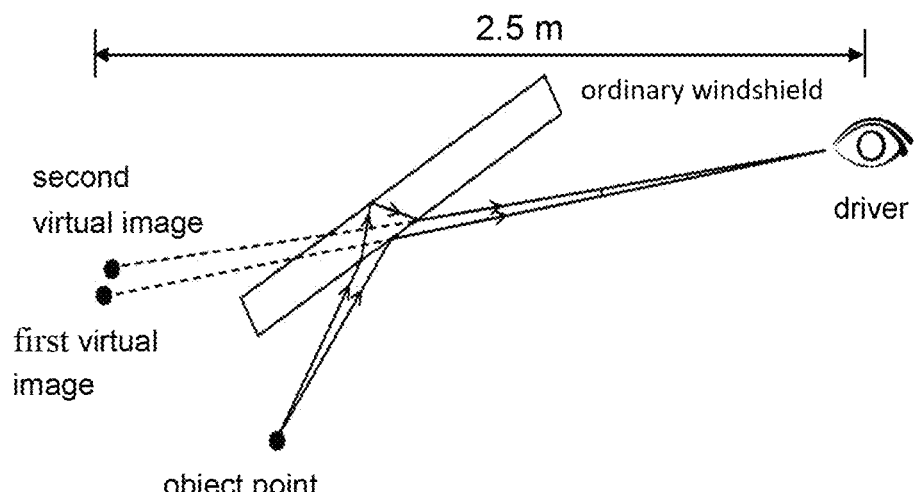
FIG. 2 is a diagram schematically showing two virtual images generated by a conventional ordinary windshield.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Figure 3:
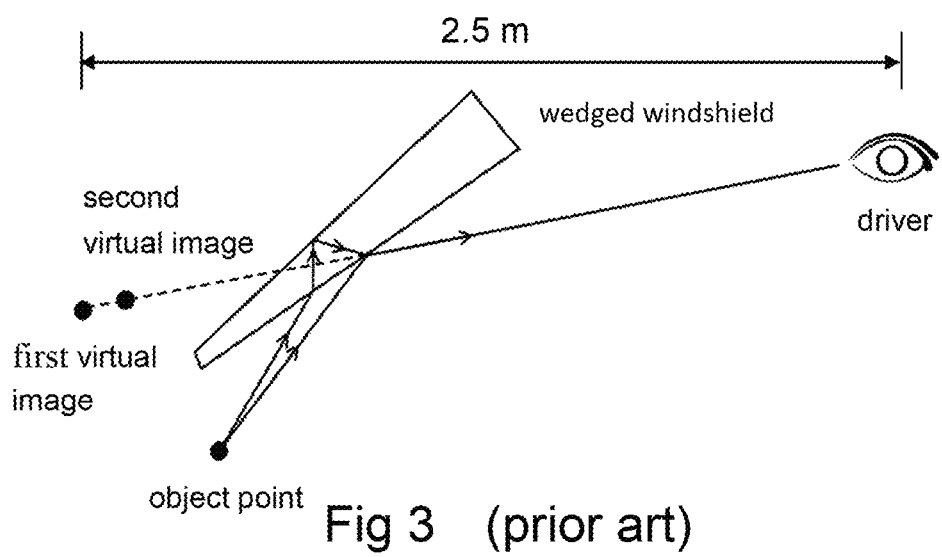
FIG. 3 is a diagram schematically showing two virtual images generated by a conventional wedged windshield.

A traditional HUD system adopts a special windshield to present virtual images about 2.0-3.0 m (typical 2.5 m) on the front of the driver. Refer to FIG. 3. The special windshield is normally a wedged windshield, which can solve the ghost image problem. In order to present the driving information to the driver effectively and guarantee the driving safety, the traditional HUD systems are demanded to meet the following standards: (1) the virtual image distance: the virtual image distance should be within 2.0-3.0 m to guarantee that the driver still keeps his reaction ability to the road condition while watching the presented information; (2) the image aberration level: in the reverse ray-tracing from the virtual image to the image source, the modulation transfer function (MTF) on the image surface (the image source) of each field should be remained at a given level, e.g. all are over 0.5; the RMS radius of the spot diagram should not exceed the radius of a single pixel of the image source; the astigmatism and distortion should not hinder the driver from watching the image.

The virtual image distance of the present invention is different from the abovementioned standard. The automotive head-up display system of the present invention generates virtual images larger than 8 m on the front of the driver to effectively decrease the ratio of ghost image to less than 0.5%, merely using an ordinary windshield and a display device. According to ergonomic studies of HUDs, the driver will not perceive two separated virtual images but only perceive the two virtual images superimposed on the line of sight while the ratio of ghost image is less than 0.5%. Therefore, the present invention can effectively solve the ghost image problem.

The present invention adopts an ordinary windshield having neither a wedged section nor an optical film. The distance between the inner surface and the outer surface is the same across the ordinary windshield. In the present invention, an image source emits light; a concave mirror reflects the light to the ordinary windshield; the ordinary windshield further reflects the light to the eyes of the driver. Thereby, the driver can watch a virtual image of the image source. In the present invention, the ratio of ghost image is less than 0.5%, and the driver can watch images clearly and comfortably. Refer to FIG. 4. In one embodiment, the automotive head-up display system of the present invention comprises an ordinary windshield 10 and a display device 20. The ordinary windshield 10 is joined with the body A of an automobile. The ordinary windshield 10 has an inner surface 12 and an outer surface 14. The distance between the inner surface 12 and the outer surface 14 is the same across the ordinary windshield 10. The inner surface 12 and the outer surface 14 are free of coating and optical film. In other words, the ordinary windshield 10 is exactly an ordinary windshield used by common vehicles. The ordinary windshield 10 is different from a processed windshield where an optical coating is plated or an optical film (such as a polarizer or an interferometer plate) is stuck. The ordinary windshield 10 uses glass having a refractive index of 1.5. The curvature of the surface of the ordinary windshield 10 is not identical in the vertical and horizontal directions. While a reflection occurs at a large angle deviating from the axis, obvious aberrations may appear, such as spherical aberrations, coma aberrations, astigmatisms, and distortions. The abovementioned aberrations are handled by the display device 20.

The display device 20 includes an image source 22 and an optical imaging module 24. The image source 22 is disposed inside the automobile body A and generates imaging light. Different from the combiner-type HUD, the display device 22 may be disposed under the instrument panel of the automobile. Therefore, the present invention keeps the visual field before the driver clear and provides a safe driving vision for the driver. In one embodiment, the image source 22 is an image source whose diagonal is 1.8 inches long. In the present invention, the image source 22 may be but is not limited to be a digital light processing (DLP) display device, a laser display device, a liquid crystal display (LCD) device, an organic light emitting diode (OLED) display device, or a light emitting diode (LED) display device. The optical imaging module 24 is disposed at the light-output side of the image source 22 and projects the imaging light generated by the image source 22 to the ordinary windshield 22. In one embodiment, the optical imaging module 24 includes at least one concave mirror 242. The concave mirror 242 reflects the imaging light to the ordinary windshield 10. The inner surface 12 reflects the imaging light to a driver B to form a first virtual image 32. The outer surface 14 reflects the imaging light to the driver B to form a second virtual image 34. The distance between the first virtual image 21 and the driver B is greater than or equal to a virtual image distance LD. The ratio of ghost image determined by the first virtual image 32 and the second virtual image 34 is lower than an allowed value. Therefore, the driver can enjoy clear and comfort imaging quality. In one embodiment, the virtual image distance LD is equal to or larger than 8 m. However, the present invention does not limit that the virtual image distance LD must be equal to or larger than 8 m. In the present invention, the virtual image distance LD between the first virtual image 32 and the driver B may be 10 m, 30 m, 50 m, or an infinite length.

Herein is explained the meaning of the ratio of ghost image. Refer to FIG. 5. FIG. 5 shows the ghost image phenomenon generated by the first virtual image 32 and the second virtual image 34 along the direction perpendicular to the line of sight (the Z-axis direction), while the second virtual image 34 is projected to the plane where the first virtual image 32 is located along the line of sight. The distance between the neighboring edges of the second virtual image 34 and the first virtual image 32 is defined as S1. The height of the first virtual image 32 is defined as S2. The ratio of S1 to S2 is defined as the ratio of ghost image. The Z-axis direction here is defined as the direction perpendicular to the line of sight of the driver B.

Figure 6:
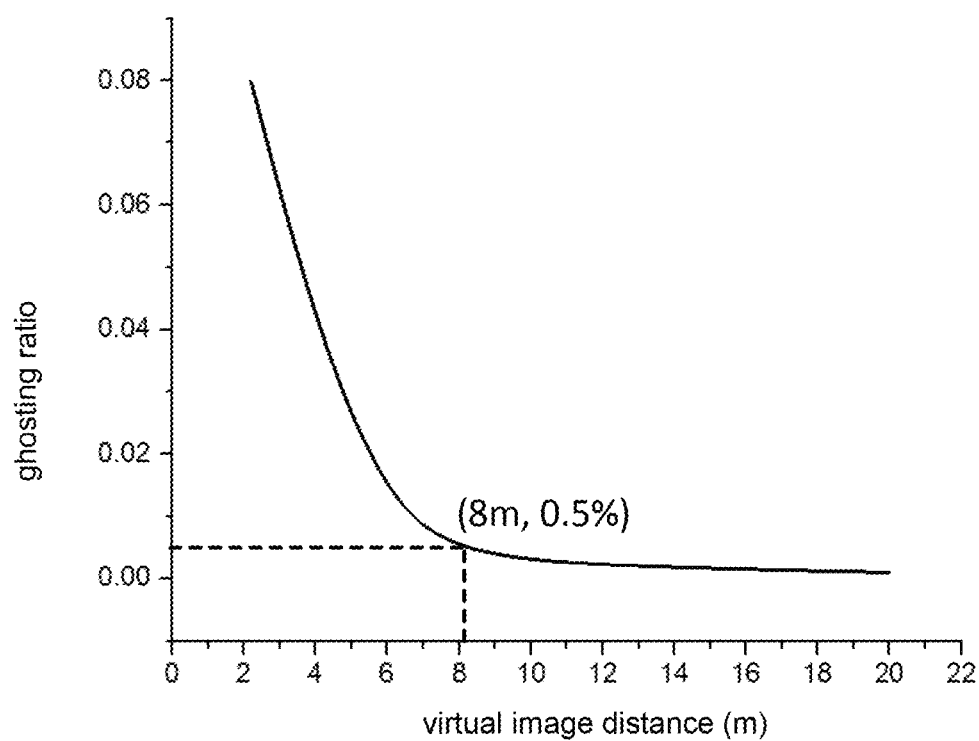
FIG. 6 is a diagram showing the relationship between the ratio of ghost image and virtual image distance according to one embodiment of the present invention.

Below are explained the working principles of the present invention. The present invention demands that the distance between the first virtual image 32 and the driver B must be greater than or equal to the virtual image distance LD (such as 8 m), which is different from the distance of 2-3 m instructed by the conventional technology. Below is also explained the reason that the ghost image problem can be solved while the distance between the first virtual image 21 and the driver B is greater than the virtual image distance LD. Refer to FIG. 4. In one embodiment, the ray-tracing method is used to work out the relationship between the ratio of ghost image and the virtual image distance. In the ray-tracing, the optical path is traced from the image source 22, through the optical imaging module 24 and the windshield 10 to the driver, whereby to work out the positions of the first virtual image 32 and the second virtual image 34. Refer to FIG. 4 and FIG. 5. The glass of the ordinary windshield normally has a refractive index of 1.5. The ordinary windshield is tilted by 31 degrees with respect to the ground. The line of sight of the driver is tilted by 5 degrees with respect to the ground. While the first virtual image is generated 2.2 m on the front of the driver by the display device 20 and the ordinary windshield 10, the ratio of ghost image determined of the first virtual image 32 and the second virtual image 34 is 8%, which is too large to watch the driving information clearly. While the first virtual image is generated 8 m on the front of the driver by the display device 20 and the ordinary windshield 10, the ratio of ghost image determined by the first virtual image 32 and the second virtual image 34 is 0.5%. While the first virtual image is generated 20 m on the front of the driver by the display device 20 and the ordinary windshield 10, the ratio of ghost image of the first virtual image 32 and the second virtual image 34 is 0.01%. In such a case, the driver would not perceive the ghost image phenomenon. The refractive index of an ordinary windshield, the tilt angle of the ordinary windshield, and the tilt angle of the line of sight of the driver are fixed normally. Therefore, the ray-tracing method can work out that the relationship between the ratio of ghost image and the virtual image distance is a monotonic decreasing function, as shown in FIG. 6. In one embodiment, the distance between the driver and the first virtual image 32 generated by the automotive head-up display system is greater than 8 m and the resultant ratio of ghost image is less than 0.5%. According to ergonomic studies of HUDs, human eyes are unlikely to perceive so weak a ghost image phenomenon in such a case. Therefore, the present invention can realize an automotive head-up display system almost free of the ghost image problem by merely using an ordinary windshield. While the present invention is adopted, variations of the tilt angle of the ordinary windshield and the tilt angle of the sight line of the driver would not increase the ratio of ghost image to such an extent that the driver can perceive the ghost image phenomenon.

Figure 9:
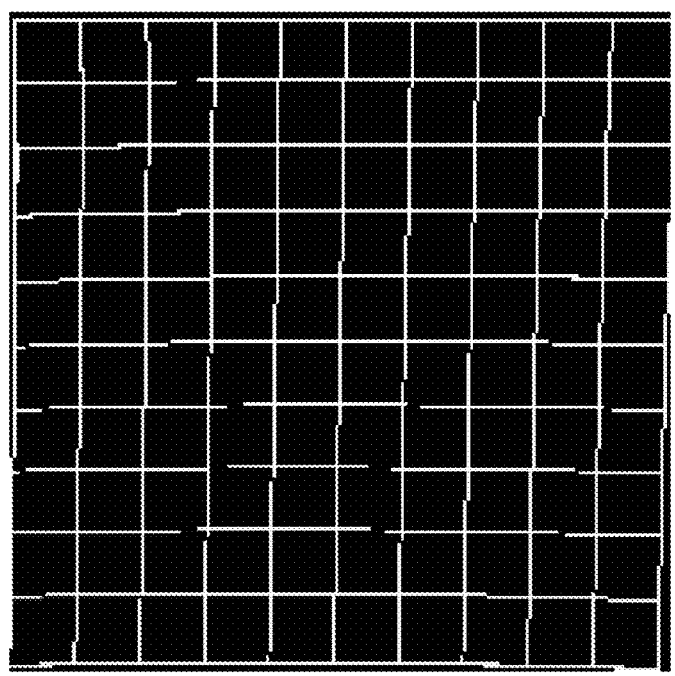
FIG. 9 is a diagram showing a simulated image of grid wires according to one embodiment of the present invention.

How to generate virtual images at a farther distance according to the abovementioned relationship between the ratio of ghost image and the virtual image distance to solve the ghost image problem is exactly the focus of the present invention. Refer to FIG. 4 and FIG. 9. In one embodiment, a first distance L1 between the image source 22 and the concave mirror 242 of the optical imaging module 24 is smaller than 0.5 times of the curvature radius of the concave mirror 242, whereby the distance between the driver B and the first virtual image 32 generated by the automotive head-up display device is larger than or equal to 8 m. However, the present invention is not limited by this embodiment.

As mentioned above, the present invention uses the ordinary windshield 10 to reflect the imaging light coming from the concave mirror 242 to form the virtual images. However, the surfaces of the ordinary windshield 10 normally have non-identical curvatures in the vertical and horizontal directions. In such a case, a reflection deviating from the axis by a large angle would cause significant aberrations, such as spherical aberrations, coma aberrations, astigmatisms, and distortions. Therefore, the optical designs of the curved surfaces of the ordinary windshield 10 and the concave mirror 242 must be taken in consideration so as to solve the aberration problem. The shape of the curved ordinary windshield 10 has a significant influence on the aberration level of the images. The optical design of the concave mirror 242 can overcome the abovementioned influence. Considering the non-identical curvatures of the ordinary windshield 10 in the vertical and horizontal directions, the concave mirror 242 should has an aspherical shape with a non-rotational symmetry so as to counteract the aberrations generated by the ordinary windshield 10. In one embodiment, the concave mirror 242 is a curved surface with a non-rotational symmetry, wherein a first curvature of the cutting line of the sagittal plane is different from a second curvature of the cutting line of the meridian plane. In other words, the curvature in the vertical direction of the concave mirror 242 is different from the curvature in the horizontal direction of the concave mirror 242, whereby to counterbalance the aberrations generated by the ordinary windshield 10. The shape of the concave mirror 242 of the optical imaging module 24 is determined by Equation (1):

$$z(x, y) = \frac{c_x x^2 + c_y y^2}{1 + \sqrt{1 - (1+k_x)c_x^2 x^2 - (1+k_y)c_y^2 y^2}} + \quad (1)$$

-continued $$\sum_{i=1}^{N_x} \alpha_i x^i + \sum_{i=1}^{N_y} \beta_i y^i + \sum_{i=1}^{N_z} A_i Z_i(\rho, \varphi)$$

In the horizontal and vertical (meridian and sagittal) planes, the vector height z(x,y) of the curved-surface mirror presents different patterns, which are two conic sections respectively having different curvatures ($c_x=1/R_x$ and $c_y=1/R_y$) and different conic coefficients ($k_x$ and $k_y$). In order to correct various types of aberrations over a large visual field, high order aspherical coefficients ($\alpha_i$ and $\beta_i$) and even the Zernike polynomials ($A_i$ and $Z_i$) are added to the conic section-based equation. Equation (1) is related with the control parameters of the shape of the ordinary automotive windshield and the distance between the ordinary windshield and the curved-surface mirror. The computer aided design technology can be used to optimize the shape of the curved-surface mirror as long as the physical shape of the curved surface of the ordinary windshield 10 is given. However, the present invention is not limited by the abovementioned embodiments. The persons having ordinary knowledge of the art should be able to modify or vary the design according to the present invention without departing from the scope of the present invention.

In one embodiment, a 1.8 in. (40 mm×22 mm) image source is used as the image source 22; the curved surface of the concave mirror 242 of the optical imaging module 24 has a first curvature of the cutting lines in the meridian/horizontal direction and a second curvature of the cutting lines in the sagittal/vertical direction; the first curvature radius is within 475-574 mm; the second curvature radius is within 650-750 mm; the first distance L1 between the image source 22 and the concave mirror 242 of the optical imaging module 24 is within 220-280 mm. If a larger or smaller image source is used in another embodiment, the first and second curvatures of the concave mirror 24 and the first distance L1 between the image source 22 and the concave mirror 242 should be increased or decreased proportionally according to the size of the image source 22. However, the present invention is not limited by the abovementioned embodiments. The persons having ordinary knowledge of the art should be able to modify or vary the design according to the present invention without departing from the scope of the present invention.

Embodiment I

Figure 7:
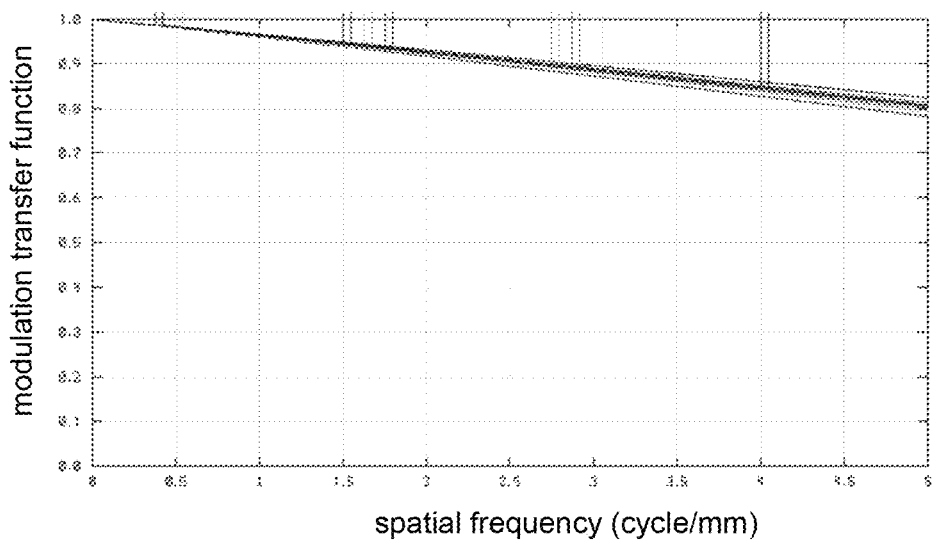
FIG. 7 is a diagram showing modulation transfer functions of different visual fields of the virtual image according to one embodiment of the present invention.
Figure 8:
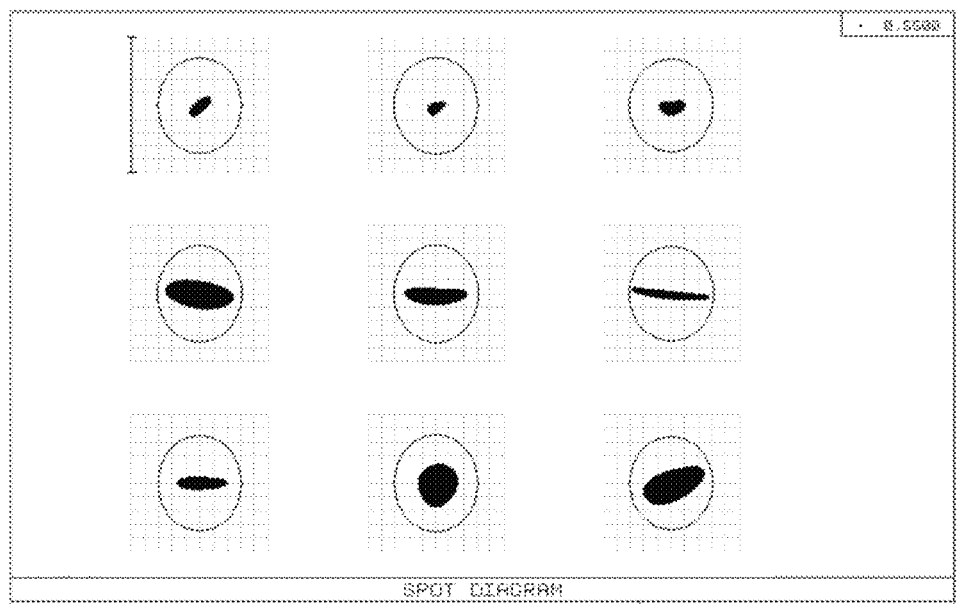
FIG. 8 is a diagram showing spot diagrams of different visual fields of the virtual image according to one embodiment of the present invention.

Refer to FIG. 4. The automotive head-up display system of the present invention comprises an ordinary windshield 10 and a display device 20. The ordinary windshield 20 is an ordinary windshield. The display device 20 includes an image source 22 and an optical imaging module 24. The display device 20 is disposed under the instrument panel of an automobile body A. In one embodiment, the vertical curvature radius of the area of the ordinary windshield 10 on the front of the driver, is 7000 mm, and the horizontal curvature radius is 2500 mm; the distance between the driver B and the ordinary windshield 10 is 900 mm; a 1.8 inch (40 mm×22 mm) image source is used as the image source 22; a virtual image having an aspect ratio of 2:1 and a diagonal of 46 inches (6°×3° if described by the field angles) is projected to a position about 10 m (the virtual image distance LD) on the front of the driver B. The optical imaging module 24 is optimized according to the abovementioned parameters. In this embodiment, the optical imaging module 24 is merely consisted of a concave mirror 242 and free of another optical element, such as a plane mirror or another concave mirror. In other words, none plane mirror is used to change the direction of the optical path in this embodiment. Therefore, the design of the curved-surface shape of the concave mirror 242 is more complicated, determined by Equation (1) and the parameters in Table.1. The curved surface of the concave mirror 242 is a 4-order aspherical-coefficient dual-curvature conic section. However, the present invention is not limited by this embodiment. The curved surface is rotated by 42.19° around the axis perpendicular to the paper; the curved surface is eccentric by 220.131 mm along the sagittal plane. The eyes of the driver B use parallel light beams to undertake the reverse ray tracing from the eyes to the image source. The modulation transfer functions (MTF), the spot diagrams, and the simulated image of grid wires are respectively shown in FIG. 7. FIG. 8 and FIG. 9. The following facts are learned from these diagrams: the modulation transfer functions of all the visual fields are greater than 0.6 within a spatial frequency of 5 mm$^{-1}$; the maximum root-mean-square (RMS) radii of the spot diagram of all the visual fields are less than 15 μm, which is far smaller than the size of a single pixel of the liquid crystal display device and still below the diffraction limit of the system; the simulated image of grid wires shows that the system does not generate significant aberration and distortion and that the automotive head-up display system of the present invention can provide high-quality virtual images almost free of ghost images.

TABLE 1

| $c_x$ | $k_x$ | $\alpha_1$ | $\alpha_2$ | $\alpha_3$ | $\alpha_4$ |
|---|---|---|---|---|---|
| 1/35.745 | −0.997 | 3.020 × 10$^{-3}$ | 0.013 | 1.444 × 10$^{-7}$ | −5.426 × 10$^{-9}$ |
| $c_y$ | $k_y$ | $\beta_1$ | $\beta_2$ | $\beta_3$ | $\beta_4$ |
| 1/462.967 | −0.450 | 2.781 | −0.035 | 2.412 × 10$^{-4}$ | −9.093 × 10$^{-7}$ |

Embodiment II

Refer to FIG. 10. A plane mirror does not generate any aberration. Further, the precision required in assembling a plane mirror is much lower than that required in assembling a concave mirror. Thus, in another embodiment, the optical imaging module 24 further includes at least one plane mirror 144, which is disposed in the optical path between the concave mirror 242 and the ordinary windshield 10 to reflect the imaging light coming from the concave mirror 242 to the ordinary windshield 10. However, the present invention is not limited by this embodiment. In this embodiment, the vertical curvature radius of the area of the ordinary windshield 10 on the front of the driver, is 8000 mm, and the horizontal curvature radius is 3500 mm; the distance between the driver B and the ordinary windshield 10 is 900 mm; a 1.8 inch (40 mm×22 mm) image source is used as the image source 22; a virtual image having an aspect ratio of 2:1 and a diagonal of 46 inches (6°×3° if described by the field angles) is projected to a position about 30 m (the virtual image distance LD may be regarded as an infinite length) on the front of the driver B. The optical imaging module 24 is optimized according to the abovementioned parameters. In this embodiment, the optical imaging module 24 includes a concave mirror 242 and a plane mirror 244. In some embodiments, the present invention may use an arbitrary number of plane mirrors to change the direction of the optical path. Thus, the concave mirror 242 does not need too complicated a shape design in these embodiments. The curved-surface shape of the concave mirror 242 is determined by Equation (1) and the parameters in Table.2. The curved surface of the concave mirror 242 is a 2-order aspherical-coefficient dual-curvature conic section. However, the present invention is not limited by this embodiment. The curved surface is rotated by 45.67° around the axis perpendicular to the paper; the curved surface is eccentric by 221.225 mm along the sagittal plane. The eyes of the driver B use parallel light beams to undertake the reverse ray tracing from the eyes to the image source. The following facts are learned from the modulation transfer functions (MTF), the spot diagrams, and the simulated image of grid wires: the modulation transfer functions of all the visual fields are greater than 0.6 within a spatial frequency of 5 $mm^{-1}$; the maximum root-mean-square (RMS) radii of the spot diagram of all the visual fields are less than 14 μm, which is far smaller than the size of a single pixel of the liquid crystal display device and still below the diffraction limit of the system; the simulated image of grid wires shows that the system does not generate significant aberration and distortion and that the automotive head-up display system of the present invention can provide high-quality virtual images almost free of ghost images. The performance of Embodiment II is similar to that of Embodiment I and will not repeat herein.

TABLE 2

| $c_x$ | $k_x$ | $α_1$ | $α_2$ |
|---|---|---|---|
| 1/36.282 | −0.996 | 0.017 | −0.013 |
| $c_y$ | $k_y$ | $β_1$ | $β_2$ |
| 1/3335.160 | 8.472 | 0.488 | 0.003 |

It should be mentioned additionally: the optical imaging module 24 may include at one plane mirror or at least one lens. A reflective optical element (such as a plane mirror) is unlikely to generate chromatic aberration and favorable for processing colored images. A transmissive optical element (such as a lens) is characterized in symmetry and favorable for decreasing distortions. Therefore, the practical optical structure of the optical imaging module 24 varies from application scenarios and design tactics. The optical imaging module 24 may be a pure reflective system, a pure transmissive system, or a combination thereof. The optical imaging module 24 and the ordinary windshield 10 reflect the primitive image of the image source 22 to generate a virtual image at a region outside the virtual image distance LD before the driver B. The virtual image is a magnified virtual image far larger than the primitive image.

Refer to FIG. 4. One embodiment of the present invention discloses a display device 20, which cooperates with an ordinary windshield 10 to form an automotive head-up display system. The display device 20 includes an image source 22 and an optical imaging module 24. The image source 22 is disposed inside the automobile body A. The image source 22 generates imaging light functioning as an image source. The optical imaging module 24 is disposed at the light output side of the image source 22. The optical imaging module 24 projects the imaging light to the ordinary windshield 10. In one embodiment, the optical imaging module 24 includes at least one concave mirror 242. The concave mirror 242 reflects the imaging light to the ordinary windshield 10. An inner surface 12 and an outer surface 14 of the ordinary windshield 10 reflect the imaging light to the driver B to form a first virtual image 32 and a second virtual image 34. The distance between the driver B and the first virtual image 32 is greater than or equal to a virtual image distance LD. The ratio of ghost image determined by the first virtual image 32 and the second virtual image 34 is less than 0.5%. The characteristics of the image source 22 and the optical imaging module 24, the connection relationship thereof, and the embodiments thereof have been described above and will not repeat herein.

In summary, the present invention can effectively reduce the ratio of ghost image, which is generated by an automotive head-up display system, to less than 0.5%, by merely using an ordinary windshield and a display device, wherein the automotive head-up display device presents the virtual images at a position more than 8 m on the front of the driver, which is different from the abovementioned conventional standard (1). Therefore, the present invention can effectively solve the ghost image problem. Besides, the modulation transfer functions (MTF), the spot diagrams, and the simulated image of grid wires of the present invention all meet the abovementioned conventional standard (2). Therefore, the present invention is exempt from aberration and distortion and able to provide high-quality images almost free of ghost images.

In conclusion, the display device and the automotive head-up display system of the present invention make the virtual images have a ratio of ghost image less than 0.5% and make the ghost images not perceived by the driver, merely using an ordinary windshield. The present invention can effectively solve the ghosting problem neither using a wedged windshield nor using an additionally-processed windshield. The present invention also reduces the assembly and production costs of the automotive head-up display system.

What is claimed is:

1. An automotive head-up display system using an ordinary windshield, comprising
an ordinary windshield joined with an automobile body of an automobile and having an inner surface and an outer surface, wherein a distance between the inner surface and the outer surface is the same across the ordinary windshield, and wherein the inner surface and the outer surface are free of coating and optical film; and
a display device including
an image source disposed inside the automobile body and generating an imaging light; and
an optical imaging module disposed at a light-output side of the image source and including at least one concave mirror, wherein the concave mirror reflects the imaging light to the ordinary windshield, and wherein the inner surface and the outer surface of the ordinary windshield reflect the imaging light to a driver to form a first virtual image and a second virtual image, and wherein a distance between the driver and the first virtual image is greater than or equal to a virtual image distance, and wherein a ratio of a ghost image determined by the first virtual image and the second virtual image is less than or equal to 0.5%.

2. The automotive head-up display system using an ordinary windshield according to claim 1, wherein a relationship between the virtual image distance and the ratio of the ghost image is a monotonic decreasing function.

3. The automotive head-up display system using an ordinary windshield according to claim 1, wherein the virtual image distance is greater than or equal to 8 m.

4. The automotive head-up display system using an ordinary windshield according to claim 1, wherein a first distance between the concave mirror and the image source is less than 0.5 times of a curvature radius of the concave mirror.

5. The automotive head-up display system using an ordinary windshield according to claim 1, wherein the concave mirror is a non-rotationally symmetric curved surface, and wherein a first curvature of a cutting line on a sagittal plane is different from a second curvature of a cutting line on a meridian plane.

6. The automotive head-up display system using an ordinary windshield according to claim 1, wherein the optical imaging module further includes at least one plane mirror disposed in the optical path between the concave mirror and the ordinary windshield and reflecting the imaging light, which is reflected by the concave mirror, to the ordinary windshield.

7. The automotive head-up display system using an ordinary windshield according to claim 1, wherein the optical imaging module is consisted of a concave mirror.

8. A display device comprising
an image source disposed inside an automobile body of an automobile and generating an imaging light; and
an optical imaging module disposed at a light-output side of the image source and including at least one concave mirror, wherein the concave mirror reflects the imaging light to an ordinary windshield, and wherein an inner surface and an outer surface of the ordinary windshield reflect the imaging light to a driver to form a first virtual image and a second virtual image, wherein a distance between the inner surface and the outer surface is the same across the ordinary windshield, and wherein the inner surface and the outer surface are free of coating and optical film, and wherein a distance between the driver and the first virtual image is greater than or equal to a virtual image distance, and wherein a ghosting ratio of a ghost image determined by the first virtual image and the second virtual image is less than or equal to 0.5%.

9. The display device according to claim 8, wherein a relationship between the virtual image distance and the ratio of the ghost image is a monotonic decreasing function.

10. The display device according to claim 8, wherein the virtual image distance is greater than or equal to 8 m.

11. The display device according to claim 8, wherein a first distance between the concave mirror and the image source is less than 0.5 times of a curvature radius of the concave mirror.

12. The display device according to claim 8, wherein the concave mirror is a non-rotationally symmetric curved surface, and wherein a first curvature of a cutting line on a sagittal plane is different from a second curvature of a cutting line on a meridian plane.

13. The display device according to claim 8, wherein the optical imaging module further includes at least one plane mirror disposed in an optical path between the concave mirror and the ordinary windshield and reflecting the imaging light, which is reflected by the concave mirror, to the ordinary windshield.

14. The display device according to claim 8, wherein the optical imaging module is consisted of a concave mirror.

* * * * *